No. 735,786. PATENTED AUG. 11, 1903.
P. M. LINCOLN.
SYNCHRONIZING APPARATUS FOR ELECTRICAL MACHINES.
APPLICATION FILED DEC. 29, 1902.
NO MODEL.

WITNESSES:
C. L. Belcher
Birney Hines

INVENTOR
Paul M. Lincoln
BY
Wesley G. Carr
ATTORNEY.

THE NORRIS PETERS CO., PHOTO-LITHO., WASHINGTON, D. C.

No. 735,786. Patented August 11, 1903.

UNITED STATES PATENT OFFICE.

PAUL M. LINCOLN, OF PITTSBURG, PENNSYLVANIA, ASSIGNOR TO WESTINGHOUSE ELECTRIC & MANUFACTURING COMPANY, A CORPORATION OF PENNSYLVANIA.

SYNCHRONIZING APPARATUS FOR ELECTRICAL MACHINES.

SPECIFICATION forming part of Letters Patent No. 735,786, dated August 11, 1903.

Application filed December 29, 1902. Serial No. 137,074. (No model.)

*To all whom it may concern:*

Be it known that I, PAUL M. LINCOLN, a citizen of the United States, residing at Pittsburg, in the county of Allegheny and State of Pennsylvania, have invented a new and useful Improvement in Synchronizing Apparatus for Electrical Machines, of which the following is a specification.

My invention relates to means for securing synchronism of alternating-current electrical machines before connecting them together for operation in parallel, and it has for its object to provide a simple and efficient means for indicating the proper operating conditions of two mechanically-connected machines adapted for different periodicities in order that they may be connected in parallel circuit with other machines the periodicities of which are unlike, but which correspond to the respective machines to be connected therewith.

My invention is illustrated in the accompanying drawings, in which—

Figure 1:
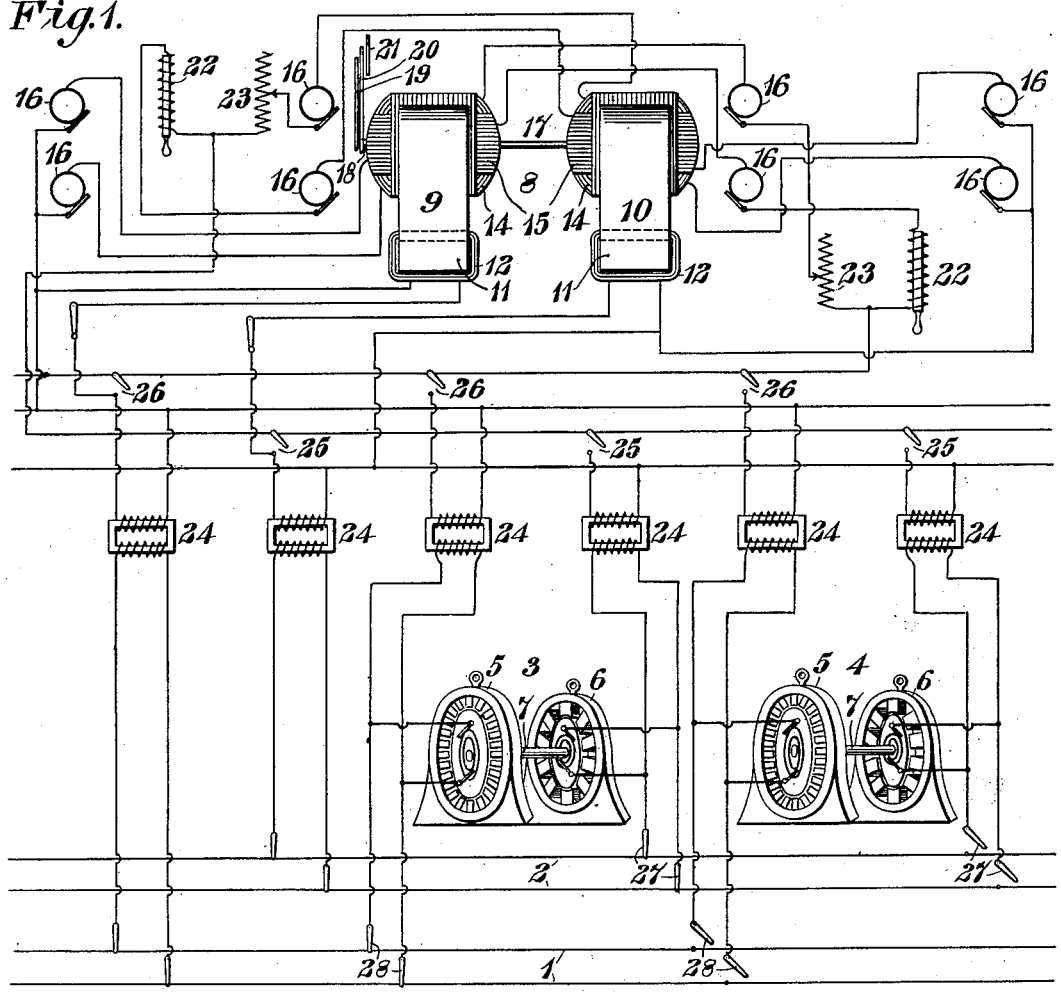
Figure 2:
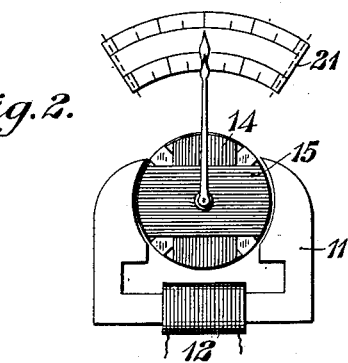
Figure 3:
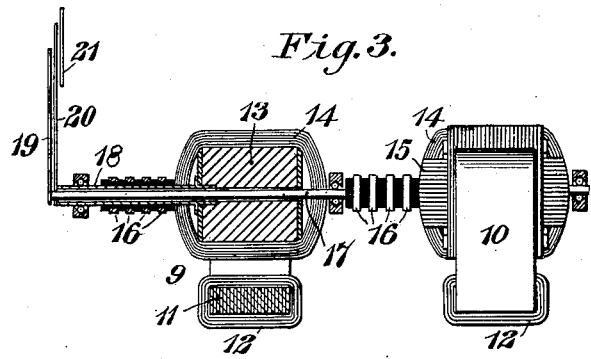

Figure 1 is a diagram of machines, circuits, and instruments constructed and arranged in accordance with my invention. Fig. 2 is an end elevation of the principal elements of the synchronism-indicator; and Fig. 3 is a view, partially in side elevation and partially in section, of the parts shown in Fig. 2.

It sometimes occurs that two synchronous alternating-current machines—such, for example, as a motor and a generator—have their rotating members mechanically connected for operation, and if it so happens that these two machines have different numbers of field-magnet poles and it is desired to connect them, respectively, in circut with other machines to operate in parallel it becomes necessary, or at least extremely desirable, to bring the said machines to such speed of operation before connecting them in circuit that when so connected they shall operate in synchronism with the machines already supplying such circuits with energy or receiving energy therefrom.

The alternating-current circuit 1, which for the purpose of simplifying the drawings is here indicated as single phase, may be assumed to be receiving energy from a source (not shown) of a given rate of alternations or periodicity—such, for example, as seven thousand two hundred alternations per minute or sixty cycles per second. The circuit 2, which is also indicated as a single-phase circuit, may be assumed to be receiving energy from a source having a different rate of alternations from that of circuit 1—such, for example, as three thousand alternations per minute or twenty-five cycles per second.

Two motor generator sets 3 and 4 are shown, each of which comprises a generator 5, having twenty-four field-magnet poles, and a motor 6, having ten field-magnet poles, the armatures of both machines of each set being shown as rigidly mounted upon a single shaft 7.

It will be apparent that if the machines 5 are connected to the circuit 1 and the machines 6 to the circuit 2 and operated in synchronism with the other machines connected to such circuits they will operate at three hundred revolutions per minute; but in order that such operation may be satisfactory it is essential that the machines be brought to synchronous speed before being connected to their respective circuits, and it is a matter of some difficulty, under ordinary conditions, to select a point at which the two machines will be in synchronism with the respective circuits to which they are to be connected provided such circuits are already receiving energy from machines having a fixed frequency relation.

It will be understood that any number of motor generator sets may be successively connected in circuit to operate in parallel, and for the purpose of determining when to make such connection I provide a synchronism-indicator 8, which comprises two instruments 9 and 10, each of which may be constructed and connected to operate in accordance with what is set forth in my Patent No. 685,155, granted October 22, 1901, or they may be of any other specific construction adapted for the purpose intended.

In the form of instrument shown the stationary member comprises a laminated core 11 and a coil 12, and the movable member comprises a core 13, two coils 14 and 15, substantially at right angles to each other, and four contact-rings 16, by means of which connection is made to the external circuits in a manner to be hereinafter described.

The armature and collector-rings of the instrument 10 are mounted upon a shaft 17, and the corresponding parts of the member 9 are mounted upon a hollow shaft or sleeve 18, that surrounds and is concentric with the shaft 17. The shaft 17 is provided at one end with a needle or pointer 19, and the corresponding end of the hollow shaft 18 is provided with a similar pointer 20, the outer ends of both of which are located adjacent to a single dial-plate 21, so as to indicate independently thereon the positions and movements of the movable members of the instruments 9 and 10.

Inasmuch as single-phase circuits are here indicated, I have shown an adjustable inductive resistance 22 in the circuit of each of the coils 15 and an adjustable ohmic resistance in the circuit leading to each of the coils 14 in order to secure a displacement of phase that approximates ninety degrees. If two-phase circuits were employed, the coils might be connected to the conductors corresponding to the respective phases and this phase-displacing means be omitted.

The coil 12 of the instrument 9 is shown as connected, through a potential-reducing transformer 24, to the circuit 1 and the coil 12 of the instrument 10 through a similar transformer 24 to the circuit 2. Similar potential-reducing transformers 24 are employed for reducing the potential of the energy from the machines 5 and 6 in order to adapt the same to the coils 14 and 15 of the instruments 9 and 10, but the energy might be transmitted directly without the interposition of transformers if not too high for the purpose.

Suitable switches 25 are shown for connecting the machines 6 to the instrument 10 and similar switches 26 for connecting the machines 5 to the instrument 9. Suitable switches 27 are also shown for the purpose of connecting the machines 6 to the circuit 2 and similar switches 28 for connecting the machines 5 to the circuit 1.

Assuming that the motor generator sets 3 and 4 are both out of circuit and that the circuits 1 and 2 are already connected to a similar set (not shown) or that the set 3 is in circuit, as is indicated by the positions of the corresponding switches 27 and 28, and it is desired to connect the set 4 in circuit, the corresponding switches 25 and 26 may be closed and the movements of the two indicating-hands 19 and 20 be observed until both indicate synchronism at the same time, when the corresponding switches 27 and 28 may be closed.

Another method of starting up the machines and utilizing the indicators which may be employed is as follows: The machine 6 may be first connected to the circuit 2 and brought to synchronism without regard to the machine 5. If the circuit 2 is polyphase, the motor may be started and brought to synchronous speed as an induction-motor, and if the circuit is single phase the motor may be otherwise started by any convenient means. The field of the corresponding machine 5 may then be excited and its armature and that of the machine 6 be connected to the synchronizing instrument by means of the switches 26 and 25. The hand of the synchronizing instrument corresponding to the machine 5 will assume a position which will indicate the number of pairs of poles it is necessary to slip on the low-frequency machine 6 in order to bring the generator 5 into synchronism with its circuit. The switch 27 of the motor 6 may be now opened and the speed of the motor be allowed to decrease until the hands indicate that both machines are operating in proper phase relation, when the switch 27 may be again closed, after which the switch 28 may be closed at the convenience of the attendant.

Other methods of manipulating the machines and synchronizing apparatus may be employed if found feasible, but in any event the relation of the two synchronizing instruments with reference to their indicating device is such that the relative operation may be readily observed and the determination of the proper operation of the two machines for connection in circuit be thus facilitated.

I claim as my invention—

1. A synchronizing instrument for alternating-current electrical machines comprising two stationary members and two rotatable members having concentric shafts, in combination with a single dial-plate and two hands or pointers respectively connected to and actuated by said shafts.

2. The combination with two alternating-current electrical circuits of different periodicity, of two mechanically-connected machines having poles corresponding in number to the respective circuits and a synchronizing instrument having coils corresponding to the circuits and the machines to be synchronized therewith, concentric shafts for the two movable members of the instrument, indicating-hands for said shafts and a single dial-plate.

3. The combination with two alternating-current circuits of different periodicity and two mechanically-connected electrical machines respectively adapted for operation at the periodicities of the said circuits, of a synchronizing instrument having sets of coils corresponding and connected to the said machines and circuits, concentric shafts for the two movable members of said instrument, two hands or pointers carried respectively by said shafts and a single dial-plate with which said hands or pointers coöperate.

In testimony whereof I have hereunto subscribed my name this 19th day of December, 1902.

PAUL M. LINCOLN.

Witnesses:
F. J. CHAPMAN,
JAMES B. YOUNG.